E. LAND.
STORAGE BATTERY COVER.
APPLICATION FILED SEPT. 17, 1917.

1,269,096.

Patented June 11, 1918.

INVENTOR
Edmund Land
by Thomas H. Ferguson
atty

UNITED STATES PATENT OFFICE.

EDMUND LAND, OF DETROIT, MICHIGAN, ASSIGNOR TO CENTURY STORAGE BATTERY COMPANY, A CORPORATION OF MICHIGAN.

STORAGE-BATTERY COVER.

1,269,096.                    Specification of Letters Patent.    Patented June 11, 1918.

Application filed September 17, 1917. Serial No. 191,709.

*To all whom it may concern:*

Be it known that I, EDMUND LAND, a citizen of the United States, residing at Detroit, county of Wayne, State of Michigan, have invented certain new and useful Improvements in Storage-Battery Covers, of which the following is a specification.

The present invention relates to covers for storage battery cells and more particularly to covers of this class which seal the cell and have provisions for venting the gases produced by the action of the elements of the cell. The principal object of the invention is to produce a cover of this particular class which shall be simple in construction and efficient in operation.

In carrying out my invention I preferably employ a closure having a central petticoated filling hole and a movable closing member for opening and closing said hole. A venting passage is opened by the movement of the closing member to its closed position from said filling hole, and closed by the movement of said closing member to its alternate or open position. The full nature of the invention will be best understood upon reference to the following detailed description taken in connection with the accompanying drawings, and the scope of the invention will be pointed out in the appended claims.

Figure 1:
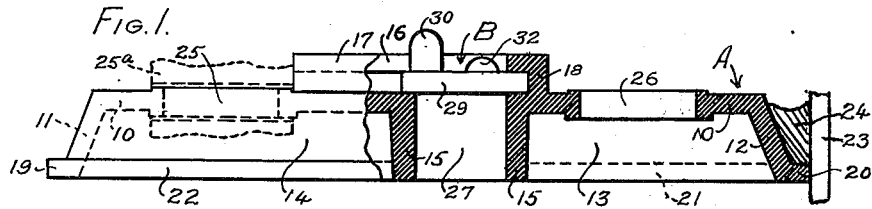
Figure 2:
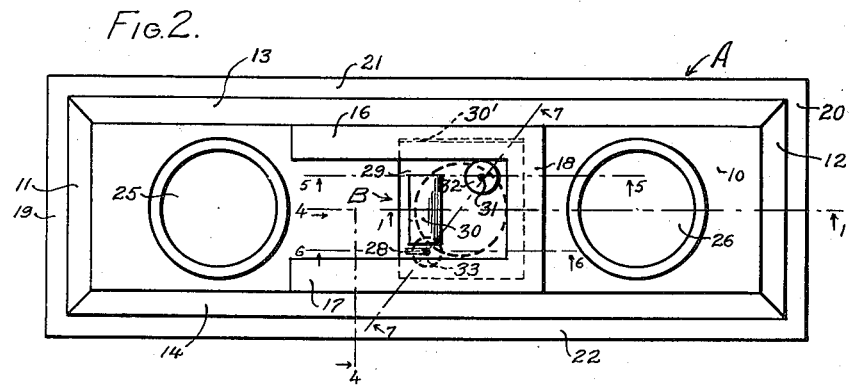
Figure 3:
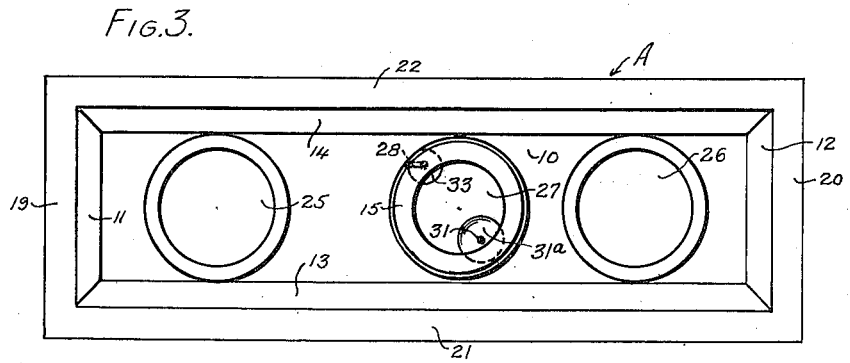
Figure 4:
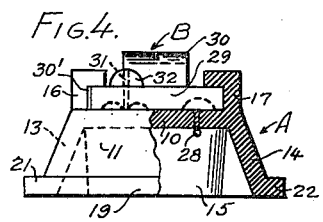
Figure 5:
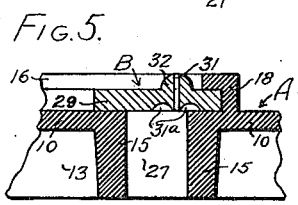
Figure 6:
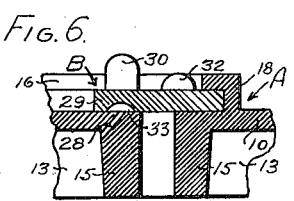
Figure 10:
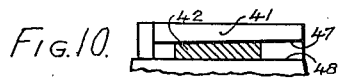
Figures 7, 8:
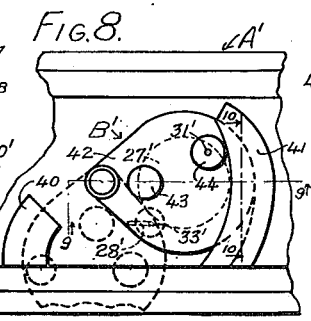
Figure 9:
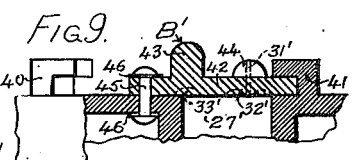

In said drawing, Figure 1 is a side view of a cover constructed in accordance with the present invention, said view being partly in elevation and partly in section upon a plane indicated by the line 1—1 of Fig. 2; Fig. 2 is a plan view of said cover; Fig. 3 is a bottom view of the same; Fig. 4 is a partial transverse section of the same, part being shown in elevation and part in section taken on a plane indicated by the line 4—4 of Fig. 2; Fig. 5 is a longitudinal section of a portion of the cover taken on a plane indicated by the line 5—5 of Fig. 2; Fig. 6 is a similar section taken on a plane indicated by the line 6—6 of Fig. 2; Fig. 7 is a section of a portion of the cover taken on an oblique plane indicated by the line 7—7 of Fig. 2; Fig. 8 is a plan view of a modified structure illustrating a pivoted closing member; Fig. 9 is a partial longitudinal section, part being shown in side elevation and part in section taken on a plane indicated by the line 9—9 of Fig. 8; and Fig. 10 is a detail view illustrating one of the stops of the modified structure in elevation and a portion of the closing member of said structure in section, the latter being taken on a plane indicated by the line 10—10 of Fig. 8. Throughout these views like characters refer to like parts.

Referring to the drawing in detail and more particularly to the form of the invention illustrated in Figs. 1 to 7, inclusive, it will be seen that the entire cover consists of but two parts, the closure, designated generally as A, and the movable closing member, designated generally as B. The closure A has a central web 10, inclined end flanges 11, 12, side flanges 13, 14, depending and closing walls forming a petticoat 15, and longitudinal guides 16, 17, connected by a transverse stop 18. Each of the inclined flanges 11, 12, 13, 14, is provided with a narrow bearing strip or foot. These bearing strips or feet are designated, respectively, 19, 20, 21, 22. When the cover is set in place in the cell, the space between these flanges 11, 12, 13, 14, and the adjacent wall of the cell is filled with a sealing compound. This manner of sealing the closure in position upon the cell, is indicated in Fig. 1, where the space between the cell wall 23 and the adjacent flange 12 is shown filled with a sealing compound 24.

The web 10 is provided with two openings 25, 26, for the passage of the battery terminals. One of these terminals is indicated in dotted lines at 25ª. These terminals, whatever their construction, are passed through the openings 25 and 26 and secured in said openings with an acid-tight joint. They may be secured in any preferred way. Beside these terminal openings 25 and 26, the web 10 is provided with a central opening 27 which is surrounded by the depending walls of the petticoat 15 and constitutes the filling hole through which water is supplied to the cell at intervals, as may be required. The walls of the petticoat 15 preferably extend down to the level of the lower edge of the cover. The web 10 is also provided with a vent or passage 28 which extends through the web and terminates on its upper side at a point adjacent to the filling hole 27.

The movable closing member B coöperates with the filling hole 27 and vent 28. In the form of the invention under consideration it comprises a flat sliding plate 29 which fits under the overhanging portions of the guides 16 and 17 and is free to slide back and forth in the guideways formed between the overhanging portions of the guides and the top of the web itself. The stop 18, which is similar in cross section to the guides 16 and 17, engages the plate 29 to limit its movement in one direction, and the battery terminal 25ᵃ engages the opposite end of the plate 29 to limit its movement in the other direction. Besides having a similar cross section, the guides 16 and 17 and stop 18 are preferably integral with each other and with the web 10. The closing member B includes a handle or projection 30 by which it may be grasped between the thumb and finger to move it back and forth. The closing member B also includes a strip 30' of soft rubber or equivalent material along one edge of the plate 29 which gives increased frictional engagement with the guide 16 and thus serves to hold the closing member in whatever position it may be placed, notwithstanding any jarring of the cell as would occur in many of its uses. The strip 30' may be secured to the edge of the plate 29 in any suitable way, as, for example, by gluing.

When plate 29 of the slide B is in its closed position, illustrated in Fig. 1, the filling hole 27 is closed, except for a second vent passage 31 which extends through the plate 29 and also through a crown or projection 32 on the upper side of the plate, which is added to give increased length to the vent 31. The under side of the plate 29 is cut away with an annular groove 31ᵃ so as to form sharp edges adjacent to the lower end of the vent 31. The length of the vent 31 and these sharp edges formed by the groove 31ᵃ, are instrumental in breaking up the gas bubbles which impinge against the under side of the plate and in carrying away the gas while leaving the moisture. While the plate 29 is in the position illustrated in Fig. 1, the vent 28 is in communication with the filling hole 27, by reason of the depression 33 formed on the under side of the plate 29. (See Fig. 7.) This depression 33 is of such size and so positioned as to overlap the vent 28 and a portion of the filling hole 27 when the plate 29 is in its closed position, that is to say, the position illustrated in Fig. 1. This overlapping is clearly illustrated in Figs. 2, 3 and 7. As will be apparent from an inspection of the latter figure, this construction allows air and gas to pass from the under side of the web through vent 28, depression 33, hole 27 and vent 31 to atmosphere, so long as the closing member B is kept in its closed or non-filling position.

When the plate 29 of the closing member B is moved to its open or filling position, the flat face of the underside of the plate will move over vent 28 and close it. When so closed, the filling of the cell with water up to the lower edge of the petticoat 15 will trap air in the space under the closure A, and the closing of vent 28 will prevent the escape of the trapped air so long as the closing member B is left in this position. When the cell is filled and the closing member B is moved to the non-filling position, the air which has been trapped between the closure A and the upper surface of the liquid will escape through vent 28, depression 33, hole 27 and vent 31. While the closing member B remains in closed or non-filling position any gases which may be generated will likewise escape either by way of the same path, or directly through filling hole 27 and vent 31. In this connection it will be noted that there is space between the side flanges 13 and 14 and the petticoat 15, so that all the space beneath the closure A will be freely vented through the single vent 28. In other words, any air trapped beneath the right-hand portion of the closure, as viewed in Fig. 1, will be free to pass around the petticoat 15 to the space beneath the left-hand portion of the closure and thence through vent 28 whenever the latter is placed in communication with atmosphere. It will be apparent that even though the attendant, when filling the cell, should fill it too full and cause it to run over, still the air which has been trapped beneath the closure A will remain trapped until the closing member B is moved to non-filling position and as soon as this takes place the level of the liquid in all parts of the cell, including the hole 27, will become the same and will be low enough to allow ample space for the passage of the gas over the liquid surface and out to atmosphere, either through the passages 28, 33, 27, 31, or directly through the passages 27 and 31.

In the second form of the invention, namely that illustrated in Figs. 8, 9 and 10, the structure of the closure A' is in general the same as that of the closure A. It differs only in that the guiding flanges of the latter are replaced by the stops 40 and 41 and provision is made for pivoting the movable closing member B' instead of arranging for the sliding action of the corresponding member B. The closure A' has a filling hole 27' and port 28' similar to the closure A. The closing member B' consists of a plate 42 having a handle 43 and a crown or projection 44 which are similar to the corresponding handle 30 and crown 32 of the closure A. The handle 43 in this instance, however, is circular in plan instead of being oblong. The under side of the plate 42 is provided with a depression 33' which is similar to the depression 33 in the plate 29. The crown 44 is also provided with a vent port 31' and a groove 32' on its under side, which are similar to the vent 31 and groove 31ª of the closure A. When the closure B' is in closed position, that is, in the position illustrated in full lines in Fig. 8, the vent 28', depression 33', filling hole 27' and vent 31', all have positions and functions corresponding to the parts 28, 33, 27 and 31 of the closing member B. In order to move the closure B' to open or filling position, it is rotated about its pivot 45 until it engages the wall of the overhung stop 40. When in this position the port 28' is closed by the under side of the plate 42 and the plate is clear of the filling hole 27'. When the closing member B' is in closed position it engages the wall of the flanged overhanging stop 41. When in this position the gas will be vented partly directly through filling hole 27' and vent 31' and partly through the path including vent 28', depression 33', hole 27' and vent 31'. The pivot 45 may be composed of any suitable material which will not be destroyed by the acid of the cell, as, for example, an alloy of lead. Suitable washers 46, of rubber or other like material, are employed to separate the heads of the pivot from the adjacent portions of the web of the closure A' and face of the plate 42. In this form of the invention the overhanging flanged stop 41 may have the under face of its overhung portion inclined so as to gradually narrow the passage into which the plate 42 is moved as the latter approaches its closed or non-filling position. This will produce a sort of wedging action and will force the plate 42 of the closing member B' tight against the upper surface of the closure A' and thereby more securely close the filling hole 27'. This is especially illustrated in Fig. 10, wherein the lower face 47 of the overhanging portion of the stop 41 approaches the horizontal face 48 as one passes from the left to the right, as the parts are viewed in that figure. The space between the faces 47 and 48 is the space into which the plate of the closing member B' moves. If desired, the latter may be slightly inclined on its upper face so as to give a better bearing surface against the inclined face 47, as clearly illustrated by the cross-hatched portion of the plate 42 in said figure.

It will be apparent to those skilled in the art to which the present invention relates, that certain minor changes may be made in the different disclosed embodiments without departing from the spirit of the invention. I therefore aim to cover all such changes by the terms of the appended claims.

What I claim as new and desire to secure by Letters Patent of the United States is:

1. A storage battery cover comprising a closure having a filling hole formed with depending inclosing walls, and a movable closing member for said filling hole movable to a closing position over said hole and to an open position to one side of said hole, said closure and closing member being provided with means for venting the space beneath said closure to allow the escape of battery gases when said closing member is in position to close said hole and for preventing the venting of said space when said closing member is in position to open said hole.

2. A storage battery cover comprising a closure having a filling hole formed with depending inclosing walls, and a movable closing member for said filling hole movable to a closing position over said hole and to an open position to one side of said hole, said closure being provided with a vent for venting the space beneath said closure, said vent being positioned relative to said closing member so that said vent will be open when said closing member in is position to close said hole and closed when said closing member is in position to open said hole.

3. A storage battery cover comprising a closure having a filling hole formed with depending inclosing walls, and a movable closing member for said filling hole movable to a closing position over said hole and to an open position to one side of said hole, said closure being provided with a vent communicating with the space beneath said closure, and said closing member having passages for registering in a certain position with said vent to extend the communication from said vent to atmosphere.

4. A storage battery cover comprising a closure having a filling hole formed with depending inclosing walls, and a movable closing member for said filling hole movable to a closing position over said hole and to an open position to one side of said hole, said closure being provided with a vent communicating with the space beneath said closure, and said closing member having one passage for registering with said vent in one position of said closing member to extend the communication from said vent to said filling hole and a second passage for extending the communication from said hole to atmosphere.

5. A storage battery cover comprising a closure having a filling hole formed with depending inclosing walls, and a movable closing member for said filling hole movable to a closing position over said hole and to an open position to one side of said hole, said closure having a vent communicating with the space beneath said closure and opening outward adjacent to said filling hole, and said closing member having a depression on its under side for overlapping said vent opening and a portion of said hole in one position of said closing member and said closing member having a smooth surface on its under side for closing said vent in another position of said closing member, and a vent for venting said hole to atmosphere when said closing member is in said former position.

In testimony whereof I have hereunto subscribed my name this 14th day of September, A. D. 1917.

EDMUND LAND.